United States Patent [19]
Ghafoor et al.

[11] Patent Number: 6,001,920
[45] Date of Patent: Dec. 14, 1999

[54] POLYMERIC COMPOSITIONS AND THEIR PRODUCTION AND USES

[75] Inventors: Mark Sirfaraz Ghafoor; Malcolm Skinner; Ian Michael Johnson, all of West Yorkshire, United Kingdom

[73] Assignee: Ciba Specialty Chamicals Water Treatments Limited, Bradford, United Kingdom

[21] Appl. No.: 09/008,860

[22] Filed: Jan. 20, 1998

[30] Foreign Application Priority Data

Jan. 20, 1997 [GB] United Kingdom .................... 9701090
Dec. 17, 1997 [GB] United Kingdom ................. 97266779

[51] Int. Cl.$^6$ ........................................................ C08J 3/07
[52] U.S. Cl. .......................................................... 524/500
[58] Field of Search ............................................... 524/500

[56] References Cited

U.S. PATENT DOCUMENTS

| | | | |
|---|---|---|---|
| 3,953,330 | 4/1976 | Tonkyn | 524/612 |
| 4,380,600 | 4/1983 | Hosoda et al. | 524/458 |
| 4,481,115 | 11/1984 | Wade | 210/727 |
| 4,929,655 | 5/1990 | Takeda et al. | 524/458 |
| 5,006,590 | 4/1991 | Takeda et al. | 524/458 |
| 5,213,693 | 5/1993 | McGrow | 210/728 |
| 5,403,883 | 4/1995 | Messner et al. | 524/458 |
| 5,451,326 | 9/1995 | Carlson | 210/708 |
| 5,480,934 | 1/1996 | Messner et al. | 524/458 |
| 5,597,859 | 1/1997 | Hurlock et al. | 524/458 |
| 5,614,602 | 3/1997 | Connors et al. | 526/307.3 |
| 5,698,109 | 12/1997 | Payne | 210/727 |
| 5,837,100 | 11/1998 | Gerli | 162/168.2 |
| 5,846,433 | 12/1998 | Sorensen | 210/709 |

FOREIGN PATENT DOCUMENTS

| | | | |
|---|---|---|---|
| 2125545 | 12/1994 | Canada | C08F 226/02 |
| 2140817 | 7/1995 | Canada . | |
| 2143564 | 9/1995 | Canada . | |
| 0 169 674 | 1/1986 | European Pat. Off. | C08J 3/12 |
| 0 183 466 | 6/1986 | European Pat. Off. | C08F 2/10 |
| 0 525 751 | 2/1993 | European Pat. Off. | C08F 20/60 |
| 624617 | 11/1994 | European Pat. Off. | C08J 3/03 |
| 0 630 909 | 12/1994 | European Pat. Off. | C08F 2/06 |
| 364175 | 12/1994 | European Pat. Off. | C08F 220/34 |
| 0 637 598 | 2/1995 | European Pat. Off. | C08F 226/04 |
| 664302 | 7/1995 | European Pat. Off. | C08F 2/10 |
| 670333 | 12/1995 | European Pat. Off. | C08F 2/10 |
| 0 717 056 | 6/1996 | European Pat. Off. | C08F 220/60 |
| 06136225 | 5/1994 | Japan | C08L 33/02 |

*Primary Examiner*—Paul R. Michl
*Attorney, Agent, or Firm*—David R. Crichton

[57] ABSTRACT

A stable, pourable, liquid composition contains a blend of at least 8% (usually at least 15%) water soluble high IV cationic polymer and a water soluble low IV cationic coagulant polymer which preferably comprises polyamine, and water soluble inorganic salt.

14 Claims, No Drawings

POLYMERIC COMPOSITIONS AND THEIR PRODUCTION AND USES

This invention relates to fluid, polymeric, compositions which contain both a high IV cationic polymer and a low IV cationic coagulant polymer, their production and their use.

It is well known to supply and use water soluble, high cationic charge, low IV (intrinsic viscosity) coagulant polymers. Often they are supplied to the customer in the form of aqueous solutions. Although the fact that these materials have relatively low IV and low molecular weight is sometimes an advantage, there are many occasions when it would be desirable if they could additionally perform in a manner that would be more usually associated with higher molecular weight materials.

Higher molecular weight, water soluble, polymers (generally of lower ionic charge) are frequently used as flocculants. Because of their higher IV and molecular weight, it is usually impracticable to supply them as aqueous solutions containing more than, at the most, 5 or 10% by weight polymer since even at 5% concentration the solutions are liable to have high viscosity, and they may even be a rigid gel at higher concentrations. Accordingly flocculant polymers are generally supplied to the customer as powders or as reverse phase emulsions (including dispersions) in oil.

When the customer receives a powder, it is generally necessary for the customer to dissolve that powder in water prior to use, and the dissolution process can be slow and inconvenient. When the customer receives an emulsion, it is again generally necessary to dissolve the polymer of the emulsion into water during use and the resultant solution is contaminated with surfactant and the oil or other continuous phase of the emulsion. This is undesirable.

There have therefore been numerous attempts to provide water soluble, relatively high molecular weight, polymer in an aqueous composition (thereby avoiding the disadvantages of dissolving powder or dealing with the oil continuous phase) wherein the resultant composition has acceptable viscosity but much higher concentration than would be associated with that high molecular weight polymer if dissolved in water.

These attempts involve suppressing swelling and/or dissolution of the higher molecular weight polymer by modification of the aqueous continuous phase in which it is dispersed and/or by modification of the polymer. Such products are generally referred to as "water-in-water emulsions", even though the physical state of the higher molecular weight material may not necessarily be a true emulsion.

An early disclosure of a water-in-water emulsion is in U.S. Pat. No. 4,380,000. This describes polymerising monomers in an aqueous phase containing a water soluble polymer. Inorganic salt can be added before or after the polymerisation. Thus, in Example 21, acrylic acid is polymerised in a solution of 100 g water, 15 g PEG, 10 g polyvinyl alcohol and 15 g NaCl. Although the generic description includes both non-ionic and ionic water soluble polymers for the solution, the polymer which is used as the sole or main polymer in the solution in most of the examples is a polyethylene glycol, for instance having molecular weight which can range from 6,000 to 20,000.

The only named ionic material is polyethylene imine and, in the examples, when this is used it is used solely as a minor component with a much larger amount of non-ionic polymer. It is necessary that the solution viscosity should not be too high (as otherwise the composition is not pourable) and this places severe constraints on the monomers which can be polymerised in the aqueous phase and the IV or molecular weight to which they can be polymerised.

Although U.S. Pat. No. 4,380,600 alleges that the described technique using polyethylene glycol is capable of giving fluid dispersions of high molecular weight polymer, so far as we are aware this process has not proved commercially successful. A reason for this may be that evidence by others has indicated to us that reproduction of an example in it did not lead to a fluid composition but instead led to something which became solid quite quickly. Hydroxy compounds are mentioned in JP 6136225, EP-A-183,466 and EP-A-630,909.

In EP 169,674 we describe the formation of fluid compositions by milling preformed, high molecular weight, polymer gel of, for instance, cationic polyacrylamide into a continuous phase of, for instance, low molecular weight polymeric DADMAC (diallyl dimethyl ammonium chloride) or polyamine or polyethylene imine. However this necessitated the preliminary formation of aqueous polymer gel and its incorporation into the continuous phase, and it was difficult to obtain a fluid composition that had good storage stability and low viscosity at relatively high polymer content.

Processes are known in which the tendency of the higher molecular weight polymer to swell and dissolve into the aqueous phase is suppressed by copolymerising into that polymer a relatively hydrophobic monomer (for instance U.S. Pat. Nos. 5,403,883, 5,614,602 and 5,480,934 and EP-A-525,751). In other processes various additives are included in the aqueous phase in order to try to control swelling and dissolution of the polymer, for instance polymeric dispersant in CA 2,143,564 and 2,140,817 and polyvalent salt in U.S. Pat. Nos. 4,929,655 and 5,006,590. Hydrophobic polymeric dispersant is proposed in U.S. Pat. No. 5,597,859 and CA-A-2,125,545. However it seems none of these proposals have been widely adopted commercially and the need remains to try to find a satisfactory way of providing an aqueous composition which has adequately low viscosity and yet which contains both coagulant and flocculant in usefully high concentrations and wherein the flocculant can have a usefully high molecular weight.

In EP 262,945 we described forming a cationic polymer by polymerisation within an aqueous phase of, for instance, aqueous polyamine or aqueous poly DADMAC. In the examples, cationic homopolymer was formed. In example 1, a composition was formed of about 12% cationic homopolymer, 12% polyamine and 76% water and the viscosity of the composition was rather low. In another example 2 the composition was formed of about 16% cationic homopolymer, 16% poly DADMAC and 67% water. The viscosity was higher.

It would be desirable to be able to provide a fluid, pourable, stable composition which has a relatively high content of active polymer (e.g., active for the purposes of coagulation or flocculation) and which is in the form of a water-in-water emulsion. It would be desirable to provide such a dispersion having a high content of high IV polymer, and to provide flocculation processes using such compositions.

According to the invention we provide a stable, pourable, liquid composition containing 15 or 20 to 60% by weight of a blend of a water soluble high IV cationic polymer and a water soluble low IV cationic coagulant polymer, wherein the water soluble high IV polymer is a polymer of water soluble ethylenically unsaturated monomer or monomer blend which includes cationic monomer and the polymer has an apparent IV (defined below) of at least 2 dl/g and is present in a composition in an amount of at least 8% by weight, preferably above 15% by weight, the water soluble low IV cationic coagulant has an IV (defined below) of not more than 1.5 dl/g and preferably comprises a polyamine which is present in an amount of less than 25%, and the composition has a viscosity (Brookfield RVT, spindle 6, 20 rpm, 25° C.) of less than 30,000 cps and is a dispersion of the high IV polymer in an aqueous phase which is an aqueous solution of the low IV coagulant polymer and water soluble inorganic salt.

Thus the invention provides an aqueous, oil-free, fluid composition of high IV polymer and which is fluid despite having a high polymer content.

The pourable composition is made by forming the aqueous phase which is the aqueous solution of the coagulant polymer and the inorganic salt, dissolving the monomer or monomer blend which is to provide the high IV polymer in that aqueous phase and then polymerising the monomer or monomer blend to form the high IV polymer dispersed in the aqueous phase.

The composition is stable, pourable and liquid in the sense that substantially no permanent settling occurs when the composition is allowed to stand for several weeks and the composition has a sufficiently low viscosity that it can be poured. Preferably no sedimentation occurs, but if any sedimentation does occur the sedimented phase is capable of being re-suspended by simple stirring. The viscosity of the composition is preferably below 20,000 cps, most preferably below 15,000 cps and often below 10,000 cps. It can be as low as, for instance, 500 or 1,000 cps but is generally above 2,000 cps. All these values are determined by Brookfield RVT, spindle 6, 20 rpm. The polymers also have a viscosity in the range 1,000 to 25,000 cps or 30,000 cps when measured at 10 rpm.

The composition preferably has the form of a clear liquid or an opaque liquid. It is substantially free of gel or lumps. If such gel or lumps form then it is necessary to modify the aqueous phase so as to achieve the desired pourable liquid state. For instance the amount of coagulant polymer or inorganic salt may be varied.

The monomers of which the high IV polymer are formed may consist solely of cationic monomer so that the polymer can be a cationic hompolymer or a copolymer made from two or more different cationic monomers. Often, the monomers are a blend of one or more cationic ethylenically unsaturated monomers with one or more other ethylenically unsaturated monomers. Thus the polymer may be formed from 1 to 100 by weight cationic monomer and 0–99% other monomer. Often the blend is formed with acrylamide or other water soluble ethylenically unsaturated non-ionic monomer. The polymer may be a cationic amphoteric polymer, in which event ethylenically unsaturated anionic monomer is included in the monomer blend in an amount which is not more than the amount of cationic so as to give a cationic amphoteric polymer. The anionic monomer may be a carboxylic monomer or a sulphonic monomer, e.g., acrylic acid or AMPS.

Preferred polymers contain at least 10% and usually at least 30% and often at least 50% (by weight of the total monomer) of the chosen cationic monomer or monomers. If acrylamide or other non-ionic or anionic monomer is present, the amount is usually at least 0.5% by weight, e.g., 10 to 70%. If anionic monomer is included, the amount of anionic monomer is below 50% and usually 0.5 to 25% by weight, but often it is zero.

The cationic monomer can be a diallyl quaternary monomer, generally diallyl dimethyl ammonium chloride DADMAC, but preferably is a dialkylaminoalkyl (meth)-acrylate or -acrylamide, wherein the alkyl groups generally contain 1 to 4 carbon atoms. Examples are dimethyl or diethyl aminoethyl or propyl (meth)-acrylate or -acrylamide or dimethyl or diethyl aminomethyl (meth) acrylamide. The monomer may be introduced as an acid addition salt or quaternary ammonium salt or the polymer may be converted into such a salt after polymerisation. The quaternising group is usually methyl chloride or other aliphatic quaternising group. Preferably the high IV polymer is substantially free of hydrophobic, solubility-reducing, groups such as C4 or higher alkyl (e.g., above C8) or aromatic (such as benzyl) groups on the quaternary nitrogen or elsewhere, since such materials are unnecessary in the invention and reduce the cost performance benefit of the products.

The high IV cationic polymer can be made in the presence of a small amount (typically 5 to 1,000 ppm, often 5–100 ppm) of polyethylenically unsaturated monomer or other cross linking agent so as to give products which have an ionic regain of at least 20%, as described in EP 202,780.

The high IV polymer is formed by polymerisation in the composition under conditions such that it has an apparent IV of at least 2 dl/g and usually considerably more. For instance usually it has an apparent IV of at least 4 dl/g and thus its molecular weight is sufficiently high that it will contribute useful bridging flocculation properties when used for treating a suspension. The apparent IV is often above 5 dl/g up to 14 dl/g or higher. Generally it is in the range 5 to 12 dl/g.

All these values are the apparent IV, that is to say the intrinsic viscosity as determined by observation of viscosities of aqueous compositions prepared from the whole composition of the invention in one molar sodium chloride buffered to pH 7.5 at 25° C. using a suspended level viscometer, wherein the apparent IV is determined by calculation based on the weight of the high IV polymer in the composition. Thus if, for instance, the composition contains 10% by weight of the acrylamide polymer the entire composition is utilised for preparing the solution required for IV measurements but the amount of polymer in such solutions, when calculating the IV, is assumed to be 10% by weight of the composition. The IV measured at pH 7.0 will be close to the IV measured at pH 7.5 and pH 7.0 can be used instead of pH 7.5.

The amount of the water soluble high IV cationic polymer is usually above 15% and preferably it is at least 17% and generally at least 20%. Preferred compositions generally contain from 20 or 25% up to 30 or 35%, but compositions of the invention can contain as much as 40% of the high IV polymer or more. These percentages are by weight of the total composition.

The water soluble low IV cationic coagulant has an IV of not more than 1.5 dl/g as measured using a suspended level viscometer on solutions of the coagulant polymer alone in 1 molar sodium chloride buffered to pH 7.5 at 25° C. It is generally present in an amount of at least 2 or 3%, often at least 5%, by weight of the composition. The cationic coagulant preferably comprises a polyamine coagulant polymer, for instance a polymer made by condensation of an amine and/or a diamine or higher amine (e.g., ethylene diamine or tetraethylene pentamine) with epichlorohydrin or other epihalohydrin or with dichloroethane or other dihalo alkane. Preferred polymers are formed by condensation of epichlorohydrin with dimethylamine and a small amount of ethylene diamine or other multi-amine to cause cross linking.

Usually the polyamine coagulant is used as the only low IV cationic coagulant but if desired blends of it with other low IV cationic coagulants can be used. If a blend of coagulant polymers is being used, the polyamine is usually more than 50% (and generally above 80%) of the blend. The total amount of polyamine (and usually the total amount of low IV cationic coagulant) is less than 25% but is usually at least 2 or 3% by weight of the total composition. Generally it is not more than 15% and preferably not more than 10%.

One suitable other cationic coagulant that can be used as part of the coagulant polymer is cationic dicyandiamide polymer. Another suitable coagulant polymer is polyethyleneimine. Another is a homopolyer or a high cationic copolymer of water soluble ethylenically unsaturated cationic monomer optionally with a comonomer, usually not more than 30% by weight acrylamide. The cationic monomer can be any of those discussed above for the high IV polymer but is preferably DADMAC.

Although it is not preferred (since the resultant compositions normally have to include less of the high IV polymer) the polyamine can also be replaced entirely by one or more of these coagulant polymers.

The only essential polymers which are present in the invention are preferably conventional water soluble high IV and water soluble low IV polymers. Thus, in the invention, it is preferred that there is no deliberate addition of a polymer which contains hydrophobic groups and which will therefore have a significantly lower solubility in water than conventional water soluble coagulant and flocculant polymers.

When referring to a water soluble monomer we mean that the monomer has conventional high solubility at 25° C., generally above 5 or 10% in deionised water, and similarly a water soluble polymer has conventional high water solubility typically of above 5 or 10% in deionised water, at which concentration it may form a gel when the IV is high.

Compositions of the invention preferably contain more of the high IV polymer than the coagulant polymer, e.g., a weight ratio of 1:0.1 to 1 and generally 1:below 1, usually around 1:0.15 to 0.5.

The amount of water in the composition is usually from 30 to 70%, preferably around 40 to 60%, and in particular it is generally in the range 45 to 55% by weight of the total composition.

It is necessary to include water soluble inorganic salt in the composition. The amount is normally at least 10% by weight and is usually at least 15% by weight of the composition. It can be as much as 30% or even 35%. The upper limit is dictated primarily by the solubility of the particular salt in the composition, and in particular in the aqueous phase of the composition, since it is unnecessary and therefore undesirable to have significant amounts of undissolved salt in the composition. Preferably substantially all the salt is in solution. Preferably the concentration of salt is substantially the saturation concentration of that salt in the composition, for instance being an amount of 80 to 105%, preferably 90 to 100%, of the saturation concentration.

The salt is preferably a salt which has high solubility in water and it can be an ammonium, alkali metal or alkaline earth metal chloride, bromide or iodide, such as ammonium chloride, sodium chloride or magnesium chloride, or it can be a sulphate such as ammonium sulphate. Water soluble polyvalent salts, such as polyaluminium chloride, can be used and have the advantage that their presence may then contribute to the performance of the composition since such polyvalent salts often have coagulating properties themselves. Mixtures of salts are often preferred, especially ammonium sulphate and sodim chloride.

The composition is generally made by dissolving most or all of the salt in an aqueous solution of the polyamine (optionally blended with other polymeric coagulant) preferably so as to provide a solution which is substantially saturated in the salt, and then adding the monomer or monomer blend. Often it is desirable for the monomer or monomer blend to be added as an aqueous solution and it is then generally preferred for this solution to contain inorganic salt, preferably in an amount such that the solution is substantially saturated in the salt. Polymerisation of the monomer or monomer blend in the aqueous phase can be initiated using thermal initiator or redox initiator. Initiator may be added both to start the reaction and during the reaction. It is added in an amount and at a time which will result in th epolymer having the chosen IV.

If desired, polyethylene glycol or other multi-hydroxy compound may be included in the coagulant solution, in order to promote stability and reduce viscosity but this is usually unnecessary. The multi-hydroxy compound can be a dihydroxy, trihydroxy or higher hydroxy compound such as glycerol or a polymer such as polyvinyl alcohol. When polyethylene glycol is being used the molecular weight is preferably below 1000, e.g., about 200, but can be higher e.g., up to 4000 or even 10000.

The compositions of the invention can be used either by direct addition to a suspension which is to be treated or, more usually, after dilution to a total concentration of high IV and cationic coagulant, of generally less than 10% and frequently 0.1 to 5% by weight.

The suspension which is to be treated can be any suspension which can advantageously be treated by the two polymers either individually or in combination. Thus it may be a cellulosic suspension, for instance a paper making suspension wherein the composition is used as retention or drainage aid, or it may be a cellulosic, municipal or industrial waste suspension, especially sludges.

In the following examples, all weights are for 100% active components.

DMAEA q MeCl=Dimethylaminoethyl acrylate quaternised with MeCl

DMAEMA q MeCl=Dimethylaminoethyl methacrylate quaternised with MeCl

ACM=Acrylamide

Na AMPS=Sodium salt of 2-acrylamido 2-methyl propane sulphonic acid

TAAC=Tetraallyl ammonium chloride

APTAC=Acrylamido trimethyl ammonium chloride

EXAMPLE 1

Preparation of a water in water emulsion product, in which the flocculant has an ionic charge of 60% (weight) and the coagulant:flocculant ratio is 0.2:1.

Into a 1 liter flask fitted with a stirrer, condenser, nitrogen and thermometer was charged the continuous phase comprising

| | |
|---|---|
| water | 145.2 g |
| polyamine | 30.9 g |
| ammonium sulphate | 82.8 g |

The continuous phase was purged with nitrogen for one hour.

A monomer phase was prepared from

| | | |
|---|---|---|
| DMAEA q MeCl | 92.8 g | |
| ACM | 54.1 g | |
| Adipic acid | 7.6 | |
| water | 96.2 g | |
| NaCl | 13.1 g | |

The monomer phase was added to the continuous phase. The following initiators were then added 1.42 mls of 10% 2,2 azobis (2-amidopropane hydrochloride)

2.14 mls of 0.5% ammonium persulphate 2.14 mls of 0.5% potassium bromate 2.14 mls of 1.0% sodium sulphite The reaction is allowed to exotherm followed by leaving the reaction at 70° C. for a further hour.

The resulting product has a concentration (dry weight) of 53.8% and a Brookfield viscosity of 11400 cps.

The apparent IV of the high IV polymer is 6.1 dl/g.

The active content is 36% polymer, with the content of high IV polymer being 30%.

EXAMPLE 2

Preparation of a water in water emulsion product in which the flocculant component has a cationic charge of 40% and the coagulant flocculant ratio is 0.4:1.

As for example 1 with the continuous phase being

| | | |
|---|---|---|
| polyamine | 61.7 g | |
| ammonium sulphate | 141.7 g | |
| water | 195.4 g | |
| The monomer phase being | | |
| ACM | 148 g | |
| DMAEA q MeCl | 98.6 g | |
| Adipic acid | 7.7 g | |
| NaCl | 16.91 g | |
| water | 104.4 g | |

Initiators were as in example 1.

The resulting composition had a viscosity of 8,500 cps.

The active content is 46.5% polymer, with the content of high IV polymer being 32.8%.

EXAMPLE 3

Preparation of a water in water emulsion product in which the flocculant component has a cationic charge of 60% and the coagulant:flocculant ratio is 0.2:1.

| Continuous phase comprising | | |
|---|---|---|
| water | 145.2 g | |
| polyamine | 30.9 g | |
| ammonium sulphate | 82.8 g | |

The continuous phase was purged from nitrogen for one hour.

| A monomer phase was prepared from | | |
|---|---|---|
| DMAEA q MeCl | 92.8 g | |
| ACM | 54.1 g | |

| A monomer phase was prepared from | | |
|---|---|---|
| Adipic acid | 7.6 | |
| water | 96.2 g | |
| NaCl | 13.1 g | |
| 4.3 mls of 1% TAAC | | |

The monomer phase was added to the continuous phase. Initiators as for example 1.

The reaction is allowed to exotherm followed by leaving the reaction at 70° C. for a further hour.

The resulting product has a concentration (dry weight) of 53.1% and a Brookfield viscosity of 7500 cps.

The apparent IV of the high IV polymer was not measured as the any prepared solutions were highly structured and showed an ionic regain (see EP-A-202,780) of 26% after shearing.

The active content is 36% polymer, with the content of high IV polymer being 30%.

EXAMPLE 4

Preparation of a water in water emulsion product in which the flocculant has a cationic charge of 100% (wt)—using APTAC.

The coagulant to flocculant ratio of 0.5:1.

Into a 1 L flask fitted with stirrer, condenser, nitrogen purge and thermometer was charged the continuous phase

| | | |
|---|---|---|
| polyamine | 55.0 g | |
| $(NH_4)_2SO_4$ | 161.7 g | |
| water | 199.3 | |

The continuous phase was then degassed with nitrogen for 30 minutes.

| A monomer phase was prepared from | | |
|---|---|---|
| APTAC | 110 g | |
| $H_2O$ | 24 g | |

The monomer was then added to the continuous phase and allowed to disperse for 5 minutes.

1.42 mls azo-initiator as in Example 1 were added before the reaction was warmed to 50° C. and allowed to exotherm.

The reaction temperature was then maintained at 70° C. for a further hour.

The resulting product has a concentration (dry weight) of 59.4% a Brookfield viscosity of 18,200 cps.

The apparent IV of the high IV polymer is 4.9 dl/g.

The active content is 30% polymer, with the content of high IV polymer being 20%.

EXAMPLE 5

Preparation of a water in water emulsion product in which the flocculant has a cationic charge of 60% (wt)—using APTAC.

The coagulant to flocculant ratio is 0.2:1.

Into a 1 L flask fitted with stirrer, condenser, nitrogen purge and thermometer was charged the continuous phase

| | |
|---|---|
| polyamine | 30.9 g |
| (NH$_4$)$_2$SO$_4$ | 89.2 g |
| water | 123.1 g |

The continuous phase was then degassed with nitrogen for 30 minutes.

A monomer phase was prepared from

| | |
|---|---|
| ACM | 54.1 g |
| APTAC | 92.9 g |
| Adipic Acid | 7.7 g |
| NaCl | 18.1 g |
| H$_2$O | 98.0 g |

The monomer was then added to the continuous phase and allowed to disperse for 5 minutes. 1.42 mls azo-initiator was added as in Example 1 before the reaction was warmed to 50° C. and allowed to exotherm.

The reaction temperature was then maintained at 70° C. for a further hour.

The resulting product has a concentration (dry weight) of 57% and a Brookfield viscosity of 12,500 cps.

The apparent IV of the high IV polymer is 5.4 dl/g.

The active content is 36% polymer, with the content of high IV polymer being 30%.

EXAMPLE 6

Preparation of a water in water emulsion product in which the flocculant has a cationic charge of 20% (wt).

The coagulant to flocculant ratio is 0.2:1.

Into a 1 L flask fitted with stirrer, condenser, nitrogen purge and thermometer was charged the continuous phase

| | |
|---|---|
| polyamine | 23.8 g |
| (NH$_4$)$_2$SO$_4$ | 119.6 g |
| water | 165.2 g | for 30 minutes.

| | |
|---|---|
| ACM | 89.1 g |
| DMAEMA.qMeCl | 23.8 g |
| Adipic Acid | 5.9 g |
| NaCl | 16.4 g |
| H$_2$O | 106.2 g |

The monomer was then added to the continuous phase and allowed to disperse for 5 minutes. 1.42 mls azo-initiator were added as in Example 1 before the reaction was warmed to 50° C. and allowed to exotherm.

The reaction temperature was then maintained at 70° C. for a further hour.

The resulting product has a concentration (dry weight) of 50.6% and a Brookfield viscosity of 9200 cps.

The IV of the flocculant polymer is 7.1 dl/g.

The active content is 25.9% polymer, with the content of high IV polymer being 21.6%.

EXAMPLE 7

Preparation of a water in water emulsion product, in which the flocculant has an ionic charge of 55% Cationic, 10% anionic (weight) and the coagulant:flocculant ratio is 0.46:1.

Into a 2 liter flask fitted with a stirrer, condenser, nitrogen and thermometer was charged the continuous phase comprising

| | |
|---|---|
| water | 310 g |
| polyamine | 99.6 g |
| ammonium sulphate | 176 g |

The continuous phase was purged with nitrogen for one hour.

A monomer phase was prepared from

| | |
|---|---|
| DMAEA q MeCl | 118.1 g |
| ACM | 64.4 g |
| Adipic Acid | 10.7 g |
| water | 96.2 g |
| NaAMPS | 21.5 g |

The monomer phase was added to the continuous phase. The following initiators were then added.

2.0 mls of azo-initiator of Example 1

1.5 mls of 1% ammonium persulphate 1.5 mls of 1% potassium bromate 2.0 mls of 2% sodium sulphite The reaction is allowed to exotherm followed by leaving the reaction at 70° C. for a further hour.

The resulting product has a concentration (dry weight) of 54.6% and a Brookfield viscosity of 11,400 cps.

The apparent IV of the high IV polymer is 6.8 dl/g.

The active content is 35% polymer, with the content of high IV polymer being 23.9%.

EXAMPLE 8

Preparation of a water in water emulsion in which the flocculant has a cationic charge of 60% and the coagulant flocculant ratio is 0.3:1.

The process is conducted broadly as in Example 1, using the initiators of Example 1. The continuous phase is

| | |
|---|---|
| polyamine | 37.7 g |
| PEG 200 | 20 g |
| Ammonium Sulphate | 75.8 g |
| Sodium Chloride | 15 g |
| Water | 142.3 g |
| The monomer phase is | |
| ACM | 43.9 g |
| DMAEAq MeCl | 75.3 g |
| Adipic Acid | 6.3 g |
| Water | 103.7 g |

The resulting product has a concentration (dry weight) of 50.8% and a Brookfield viscosity of 5000 cps.

The high IV, flocculant, polymer has an apparent IV of 7.8 dl/g and its concentration in the product is 25.1%.

We claim:

1. A stable, pourable, liquid composition comprising a dispersion, in the absence of an oil phase, having an aqueous phase containing a dissolved water soluble low IV cationic coagulant, a dissolved inorganic salt and a dispersed water soluble high IV polymer, wherein the composition contains 15 to 60% by weight of a blend of the water soluble high IV cationic polymer and the water soluble low IV cationic coagulant polymer wherein
the water soluble high IV cationic polymer is formed of a water soluble ethylenically unsaturated monomer or monomer blend which includes cationic monomer and the polymer has an apparent IV of at least 2 dl/g and is present in the composition in an amount of at least 8% by weight, the water soluble low IV cationic coagulant has an IV of below 1.5 dl/g present in an amount of below 25% by weight, and the composition has Brookfield viscosity of less than 30,000 cps.

2. A composition according to claim 1 in which the amount of salt is substantially the saturation concentration of salt in the aqueous solution.

3. A composition according to claim 1 or claim 2 in which the ratio by weight of high IV polymer to coagulant polymer is from 1:0.1 to 1:1.

4. A composition according to claim 3 in which the ratio is 1.0.15 to 1:0.5.

5. A composition according to claim 1 in which the amount of high IV polymer is above 15%.

6. A composition according to claim 1 in which the amount of high IV polymer is 17 to 35%.

7. A composition according to claim 1 in which the high IV polymer is formed from 1 to 100% ethylenically unsaturated cationic monomer and 0 to 99% other ethylenically unsaturated monomer selected from anionic monomers in an amount less than the amount of cationic monomer and non-ionic monomers.

8. A composition according to claim 7 in which the high IV polymer is formed of 20 to 90% cationic monomer and 10 to 80% acrylamide.

9. A composition according to claim 7 or claim 8 in which the cationic monomer is a dialkylaminoalkyl (meth)-acrylate or -acrylamide as acid addition or quaternary ammonium salt or is diallyl dimethyl ammonium chloride.

10. A composition according to claim 1 in which the low IV cationic coagulant comprises polyamine.

11. A composition according to claim 1 in which the low IV cationic coagulant comprises polyamine in an amount of 3 to 15.

12. A composition according to claim 1 in which the composition is free of polymers containing hydrophobic groups which include alkyl containing 4 or more carbon atoms or aryl.

13. A process of making a composition according to claim 1 comprising dissolving the monomer or monomers which are to be polymerised to form the high IV polymer in an aqueous solution of the coagulant polymer and the inorganic salt in an amount sufficient substantially to saturate the solution, and polymerising the monomer or monomers.

14. A process of flocculating and/or coagulating a suspension comprising dosing into the suspension a composition according to any of claims 1 to 12 or a dilute aqueous solution formed by diluting with water a composition according to any of claims 1.

* * * * *